(No Model.)
H. CLIPP.
EGG TESTER.
No. 354,966. Patented Dec. 28, 1886.
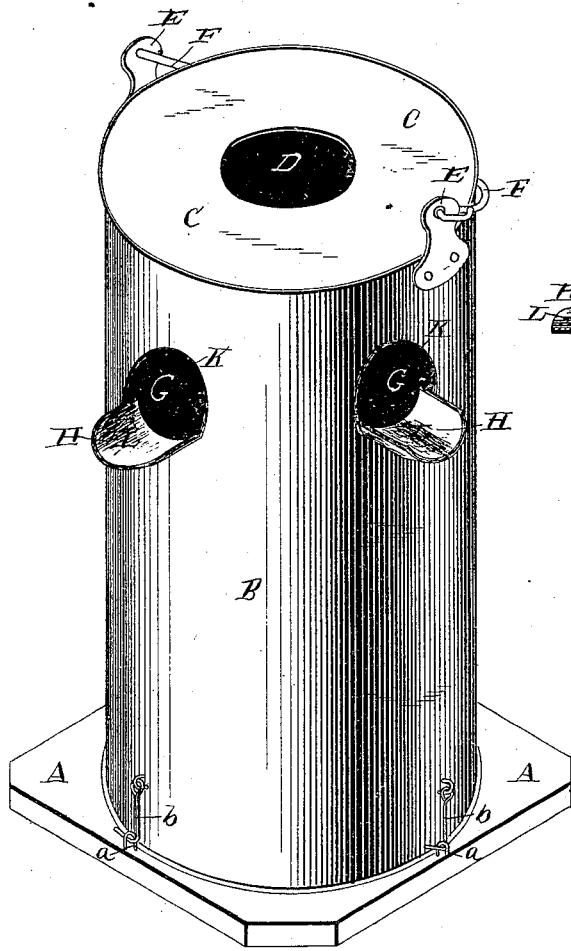
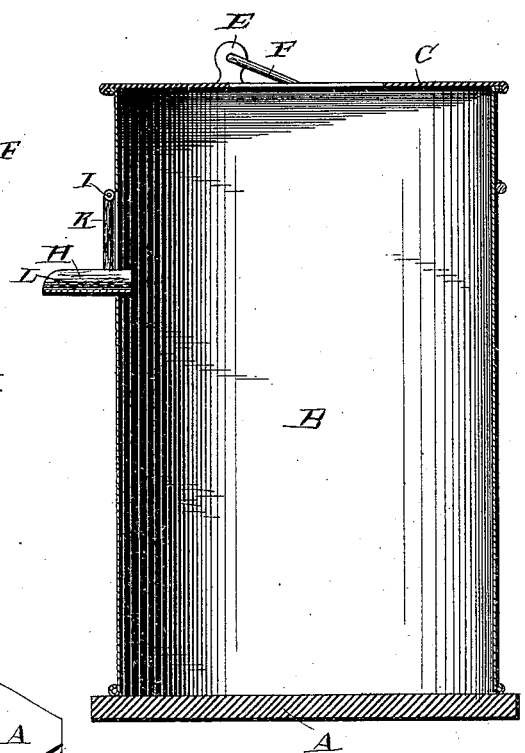
Witnesses
Chas. L. Taylor
John H. Siggers
Inventor
Hamilton Clipp
By his Attorneys
C. A. Snow & Co.

UNITED STATES PATENT OFFICE.

HAMILTON CLIPP, OF LEIPSIC, INDIANA.

EGG-TESTER.

SPECIFICATION forming part of Letters Patent No. 354,966, dated December 28, 1886.

Application filed August 28, 1886. Serial No. 212,118. (No model.)

*To all whom it may concern:*

Be it known that I, HAMILTON CLIPP, a citizen of the United States, residing at Leipsic, in the county of Orange and State of Indiana, have invented a new and useful Improvement in Egg-Testers, of which the following is a specification.

My invention relates to an improvement in egg-testers; and it consists in the peculiar construction and combination of devices, that will be more fully hereinafter set forth, and particularly pointed out in the claims.

In the drawings, Figure 1 is a perspective view of an egg-tester embodying my improvements. Fig. 2 is a vertical sectional view of the same.

A represents a base or bottom board, and B represents a vertical cylindrical vessel, which is preferably made of tin, but may be made of any other suitable material. The lower side of the vessel B is open, and the upper side thereof is provided with a top, C, having a central opening, D.

E represents vertical ears which project from the upper side of the cylindrical vessel, and F represents a handle or bail, which is made of wire and is attached to the said ears.

The base-board is provided on its upper side with staples or keepers a, and to the lower portion of the vessel B are attached hooks b, which are adapted to engage the said keepers or staples in order to secure the vessel to the base-board. Near the upper side of the vessel B are made circular openings G, of a size sufficient to receive an egg, and from the lower sides of the said openings project horizontal ledges or lips H, which form egg-rests. A ring, I, of corresponding diameter to the openings, is secured to each of the ledges H and supported immediately in front of the openings, and the said rings are covered with flannel or other suitable soft material, as at K, to form soft linings for the openings G. The ledges or egg-rests have their upper sides also covered with flannel or other soft material, as at L.

In the accompanying drawings I show two openings, G, arranged at right angles to each other; but the number of these openings may be varied, if desired.

The operation of my invention is as follows: A lamp or other suitable source of light is first placed on the center of the base-board, and must be of such a height as to bring the blaze directly in a horizontal line with the openings G when the cylindrical vessel is attached to the base. The device is placed in a darkened room, and the eggs to be tested are placed upon the ledges H and inserted in the openings G, and the operator then places his eye to the eggs and observes whether the light from the lamp shines clearly through them or whether the light is clouded by the eggs. In the latter event the eggs are worthless.

By providing two of the openings G with their supporting-ledges two persons may use the egg-tester at the same time. The openings G and supporting-ledges are covered with soft material, in order to prevent the eggs from being broken while they are being handled.

Having thus described my invention, I claim—

1. The egg-tester comprising a cylindrical vessel adapted to inclose and carry a lighting device, and having the openings G, provided with ledges covered with soft material, the said vessel being closed below, and having a bail or like means for carrying it, substantially as described.

2. The combination of the vessel A, having the openings G and supporting-ledges H, forming the egg rests or supports, with the bottom board and the hooks to secure the same to the vessel, substantially as described.

In testimony that I claim the foregoing as my own I have hereto affixed my signature in presence of two witnesses.

HAMILTON CLIPP.

Witnesses:
ORA BULEY,
JOHN E. CARR.